Jan. 9, 1951            E. HOFMAN            2,537,530
MEANS FOR TREATING MATERIALS TO KILL BACTERIA,
BACILLI, AND UNSAVORY ODORS THEREIN
Filed Oct. 30, 1947

INVENTOR.
EMIL HOFMAN
BY A. D. T. Libby
Attorney

Patented Jan. 9, 1951

2,537,530

UNITED STATES PATENT OFFICE 2,537,530

MEANS FOR TREATING MATERIALS TO KILL BACTERIA, BACILLI, AND UNSAVORY ODORS THEREIN

Emil Hofman, Newark, N. J.

Application October 30, 1947, Serial No. 783,152

6 Claims. (Cl. 21—91)

This invention relates to a process and means for carrying out the same for treating various types of materials that are used in human relationship, to kill the bacteria, bacilli or other micro-organism and unsavory odors therein or caused thereby. The process is especially adapted for treating talcum, clay and stearate powders that are used on the human body.

During the process of obtaining the raw materials and transporting and manufacturing the same into the powdered form, the materials are exposed and subjected to various types of bacteria and bacilli, and consequently these powders are charged with pathogenic infusoria of both animal and vegetable organisms in addition to having an unsavory smell. The smell in the talcum is due to the decaying infusoria of vegetable origin, while the bad smell of the stearate is caused by rancid animal fat and fish oil.

After much study and experimentation over a long period of time, I have evolved an apparatus which eliminates all of the objectionable features now found in the materials specifically mentioned.

In the apparatus or means for carrying out my process for treatment of these materials I have destroyed the bacteria and bacilli by use of ultra-violet rays delivered by cold quartz tubes which do not deliver any ozone. The ultra-violet rays convert any animal fats and fish oils into a rich vitamin D which is very essential when applied to the human skin. Simultaneously with the destruction of the bacteria and bacilli I kill all the unpleasant smells in the materials by the use of ozone generated and delivered in a controlled manner.

For the purpose of illustrating how my process may be demonstrated, I have shown an apparatus somewhat schematically for carrying out my process. In the drawing which illustrates one form in which the apparatus may take Figure 1 is an elevational view showing the means for carrying out the process.

Figure 1:
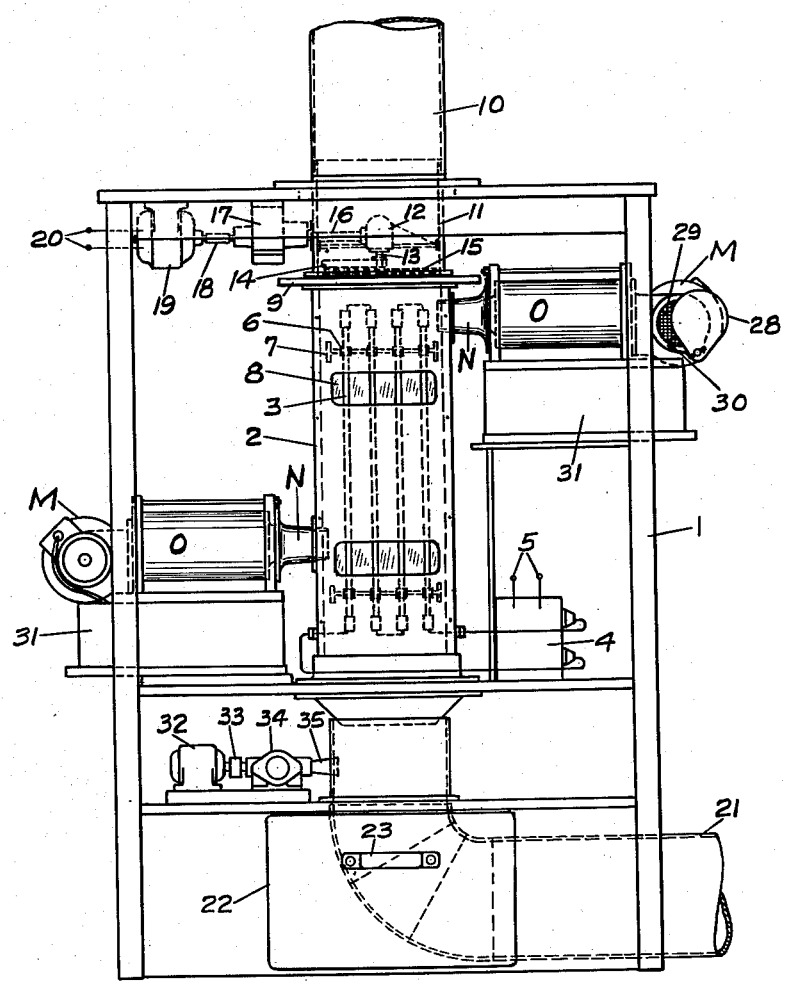

In the different figures 1 represents generally a casing or housing for the apparatus. Mounted within the casing 1 is a supplemental casing 2 within which is a plurality of cold quartz tubes 3 which may be arranged in any desired manner according to the number required for any specific installation. As shown in Figure 1, the four tubes illustrated are all connected in a series to the secondary of the transformer 4, primary leads 5 of which are adapted to be connected to any suitable source of alternating current. The tubes 3 are supported in any satisfactory manner as by clamps 6 having spring fingers to embrace the tubes. These clamps are carried by suitable supports 7. If desired, the supplemental housing 2 may have one or more windows 8 of transparent material such as glass so that the operator may observe the action taking place within the chamber 2. The upper part of the chamber 2 carries a perforated support plate 9 for passing material from the supply pipe 10 to the chamber 2 through the medium of a union 11. Within the union 11 is securely mounted a bracket 12 carrying a pair of bevel gears, one of which is connected to a shaft 13 on which is mounted a plurality of brush arms 14 which act to sift the material through the perforations in the plate 9 so the material will be properly dispersed in a finely separated manner through the chamber 2. I prefer to associate with the brushes 14 arms 15 which act on the material to prevent it from lumping up before it gets into the path of movement of the brushes 14.

The other bevel gear of the pair supported by the support 12 is connected to a shaft 16 that in turn is connected to a gear reduction 17 operatively connected by a coupling 18 to the motor 19 that is adapted to be supplied with power from the terminals 20. To the lower end of the chamber 12 is connected an outlet or discharge pipe 21. Preferably, the lower part of the casing 1 has a cover plate 22 and a handle 23 so that the union of the pipe 21 with the lower part of the housing 2 may be exposed for installation.

So far the apparatus described comprises the sterilizing apparatus that treats the material with the ultra-violet rays only.

Figure 3:
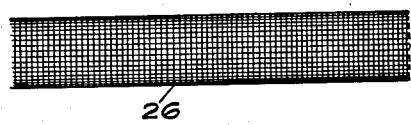
Figure 3 is a view of one of the electrodes used in the ozonator shown in Figure 2.
Figure 2:
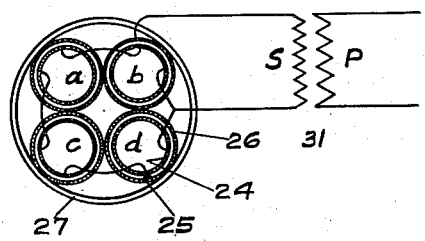
Figure 2 is a diagrammatical view showing an improved form of the ozonator used.

In order to eliminate all odor from the materials passing through the casing 2, I prefer one or more ozonators O, two being illustrated, but both being substantially alike so that the description of one will suffice for both. The ozonator O shown, more particularly Figures 2 and 3, is made up of a plurality of units, a, b, c and d. Each unit is composed of an inner electrode 24 mounted within a glass tube 25 and an outer electrode 26, one of which is shown in Figure 3. These electrodes are made up of suitable interwoven metal wire such as aluminum and, after each of the units a, b, c or d are completed they are pushed into position within an outer casing 27, preferably of good insulating material.

I have found after many experiments that this type of electrode is far superior to a solid or imperforated plate electrode or one that is perforated as the multitudinous number of contacts made provides a large number of brush type contacts with the wall of the glass tube and the ozone generated has an easy chance to escape so that the motor M can readily blow the ozone through the nozzle N into the chamber 2 and all through the material coming down from the supply pipe 10. The motor M has a cover plate 28 which is adapted to cover an orifice 29 over the blower end of the motor. The orifice 29 is covered by a wire screen 30, and internally of the screen 30 is a finer screen which may be of suitable cloth to keep out all dirt from getting into the ozonator. Since the amount of air taken in can be controlled by the cover plate 28 the amount of ozone delivered is likewise controlled. The ozonator O is, of course, provided with a transformer 31 having a primary P and secondary S, the latter of which is connected to the electrode of the units a–d as illustrated in Figure 2. It is to be understood that the external electrodes 26 of each unit are in secure electrical contact as illustrated so that one end of the secondary need only be connected to one of the outside electrodes 26.

By this arrangement I have found that more ozone can be obtained in a silent manner and with less power than can be obtained with any other ozonating apparatus with which I have contacted throughout the years past. By using a plurality of ozonators, one of which is arranged near the top of the casing 2, and the other near the bottom, I have made certain that none of the material gets through the apparatus without coming in contact with the ozone.

Since it has been the practice in the past to mask the unpleasant smell which accompanies the production of the materials mentioned by spraying them with some sort of perfume, which mankind seems to like, I have provided an automatic means for still continuing this practice, if it is found desirable to promote the sale of the product. With my improved process it is not necessary to use perfume and hence the great cost of the same is eliminated making the finished product cheaper to manufacture and cheaper for the purchaser. In order to supply perfume I have illustrated a small motor 32, a combined coupling and gear reduction 33 and a blower 34 to which may be connected a suitable source of perfume that can be blown through a nozzle 35 into the material as it passes into the exit pipe 21.

To give some general idea of the efficiency of the type of ozonator which I use in my new process it can be stated that the quantity of the ozone is such that I get not less than 140 parts of ozone to a million parts of air and under colder temperature conditions very much more, since temperature is a much more controlling factor than humidity in the generation of ozone. With my process of blowing air into the chamber along with the ozone the temperature within the chamber 2 is kept relatively low and the ozone is more effective in its work on the material, but for special cases I have found that at temperatures of 90 or 100 degrees F. I can generate ample ozone for my process by blowing a small stream from a liquid air tank into the air stream going into the blower of the motor M.

From what has been said it will be readily understood that many of the details of the apparatus per se may be varied without departing from the spirit of my invention and the scope of the appended claims.

I claim:

1. Means for killing bacteria and bacilli in materials as set forth in claim 3 further defined in that the ozone is produced by a plurality of units each consisting of a tube of suitable insulating material with circular interior and exterior metallic electrodes the latter of which are in contact with each other and the insulator and connected to one terminal of a source of current supply while the inner electrodes are connected to the opposite terminal of said current supply.

2. Means for killing bacteria and bacilli in materials as set forth in claim 3 further defined in that the ozone is produced by a plurality of units each consisting of a tube of suitable insulating material with circular interior and exterior metallic electrodes made of inter-woven wire, the exterior electrodes being in engagement with each other and connected to a source of alternating current while the interior electrodes are connected to the opposite side of said source of current.

3. Means for killing bacteria and bacilli in finely powdered materials that are used for application to the exterior part of the human body, such as talcum, clay and stearate powders as well as removing all unsavory smells in said materials, said means comprising a plurality of cold quartz tubes that generate only ultra-violet rays, means for finely separating any one of said materials and passing it into contact with said tubes, said tubes being arranged in relatively closely spaced relation so said materials may be passed in dispersed form around and over said tubes and further means including at least one controlled source of ozone applied to the materials at the same time that they are subjected to the ultra-violet rays.

4. Means for killing bacteria and bacilli in materials as set forth in claim 3 further characterized in that said further means includes a plurality of ozone sprays, at least one of which, is located adjacent the ends of the ultra-violet ray tubes where the materials first come under the influence thereof.

5. Means for killing bacteria and bacilli in materials as set forth in claim 3 further characterized in that said further means includes a plurality of ozone sprays, located at opposite ends and sides of the ultra-violet tubes.

6. Means for treating finely powdered materials that are to be used on the human body, to kill bacteria, bacilli or other micro-organisms and to remove all unsavory odors therein, said means comprising a treating chamber containing a plurality of relatively closely arranged cold quartz tubes which will deliver only ultra-violet rays with means for exciting said tubes and at least one independently controlled ozonator for delivering ozone into said chamber and means for enhancing the generation of the ozone when the temperature around the ozonator reaches points above normal room temperature, said means comprising a source of liquid air directed in a small stream into the ozonator, and means for passing the material to be treated in a finely divided state, through said chamber in close relation to said tubes.

EMIL HOFMAN.

REFERENCES CITED

The following references are of record in the file of this patent:

UNITED STATES PATENTS

| Number | Name | Date |
| --- | --- | --- |
| 919,445 | Lohman | Apr. 27, 1909 |
| 1,757,477 | Rosenhoch | May 6, 1930 |
| 1,768,635 | Schaffner | July 1, 1930 |
| 1,885,142 | Reese et al. | Nov. 1, 1932 |
| 1,948,239 | Redd | Feb. 20, 1934 |
| 1,955,669 | Botz | Apr. 17, 1934 |
| 2,153,653 | Stux | Apr. 11, 1939 |
| 2,242,163 | Bargeboer | May 13, 1941 |
| 2,265,367 | Hartman | Dec. 9, 1941 |